Figure 1:
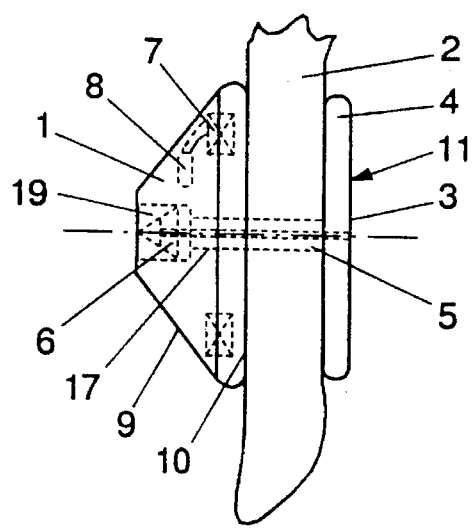

United States Patent [19]
de Jong et al.

[11] Patent Number: 5,588,234
[45] Date of Patent: Dec. 31, 1996

[54] FRAUD-RESISTANT ELECTRONIC IDENTIFICATION DEVICE

[75] Inventors: Hendrik J. de Jong, Groenlo; Ebele M. Postma, Nijmegen, both of Netherlands

[73] Assignee: N.V. Nederlandsche Apparatenfabriek Nedap, De Groenlo, Netherlands

[21] Appl. No.: 123,967

[22] Filed: Sep. 21, 1993

[30] Foreign Application Priority Data

Sep. 21, 1992 [NL] Netherlands ............. 9201626
Feb. 16, 1993 [NL] Netherlands ............. 9300289

[51] Int. Cl.⁶ ................................... G09F 3/00
[52] U.S. Cl. ................................ 40/301; 40/668
[58] Field of Search ................. 40/301, 300, 668; 63/12; 606/116, 117

[56] References Cited

U.S. PATENT DOCUMENTS

| | | | |
|---|---|---|---|
| 495,270 | 4/1893 | Rozell | 40/301 |
| 1,390,342 | 9/1921 | Delay | 40/301 |
| 3,712,655 | 1/1973 | Fuehrer . | |
| 4,196,418 | 4/1980 | Kip et al. . | |
| 4,581,834 | 4/1986 | Zatkos et al. | 40/301 |
| 4,597,208 | 7/1986 | Chevillot | 40/301 |
| 4,635,389 | 1/1987 | Oudelette | 40/301 |
| 4,718,374 | 1/1988 | Hayes | 40/301 X |
| 5,308,351 | 5/1994 | Nehls | 606/117 X |

FOREIGN PATENT DOCUMENTS

| | | |
|---|---|---|
| 0138629 | 4/1985 | European Pat. Off. . |
| 0472763 | 3/1992 | European Pat. Off. . |
| 7013532 | 9/1971 | Netherlands . |
| 8102068 | 11/1981 | Netherlands . |
| 8802209 | 4/1990 | Netherlands . |
| 9002639 | 7/1992 | Netherlands . |
| WO82/02788 | 8/1982 | WIPO . |
| WO86/00498 | 1/1986 | WIPO . |

*Primary Examiner*—Joanne Silbermann
*Attorney, Agent, or Firm*—Jacobson, Price, Holman & Stern, PLLC

[57] ABSTRACT

The identification device for animals or articles is internally provided with an electronic identification circuit enabling automatic remote detection of the code of the identification device. The identification device comprises a member comprising the identification circuit and a member serving for attachment. The member comprising the identification circuit is made of hard material. The external shape of this member, starting from a base which in operation abuts against the article or the animal, narrows substantially taperingly and smoothly to an end which in operation is located remote from the article or animal, so that this member cannot be gripped by another animal between its teeth or be caught on obstacles or other objects.

32 Claims, 4 Drawing Sheets

U.S. Patent  Dec. 31, 1996  Sheet 1 of 4  5,588,234

FRAUD-RESISTANT ELECTRONIC IDENTIFICATION DEVICE

This invention relates to an identification device for animals or articles, which identification device is internally provided with a radio-frequency identification circuit, such as described, for instance, in applicant's U.S. Pat. No. 4,196,418 and which enables automatic remote identification.

In connection with disease control and quality control, it is becoming increasingly important to individually provide all animals of a kind (for instance pigs) in an area or country or all animals, which may or may not be of the same kind, forming part of a closed chain, with a unique code, for instance a number. These numbers can then be registered centrally together with the owner of the animal and the history of the animal. When a (contagious) disease breaks out, the source can thus be easily traced, whereafter disease control can take place efficiently. But identification and registration can be utilized for a much wider range of applications, for instance in breeding programs, as a quality guarantee for export purposes and also for management purposes on the farm, such as automatic feeding, etc. For the slaughter of animals, too, automatic recognition of the carcasses on the slaughter line is of great importance. By means of automatic recognition, the quality and weight of an animal for slaughter, and hence the payment to the proper fatstock farmer, can be coupled. It will be clear, however, that an identification device, which can be attached to an animal when still very young so as to fix a life number, must remain fixedly coupled to the animal for the rest of its life. The identification device should not become detached or even be lost during the life performance of the animal and during the slaughter operations. Moreover a high degree of fraud-resistance is necessary. Further, the identification device should not hamper the growth of the animal or a part thereof. Also, the identification device should cause the least possible hindrance to the animal.

The object of the invention is to meet the need outlined above and, more generally, to provide an efficient and safe identification device. To that end, according to the invention, an identification device for animals or articles, which identification device is internally provided with an electronic identification circuit enabling automatic remote detection of the code of the identification device is characterized in that the identification device comprises a member comprising the identification circuit and a member serving for attachment; that the member comprising the identification circuit is made of hard material; and that the exterior shape of this member, starting from a base which in operation abuts against the article or the animal, narrows substantially taperingly and smoothly to an end which in operation is located remote from the article or animal so that this member cannot be gripped by another animal between its teeth or be caught on obstacles or other objects.

When an electronic identification device according to the invention is used, the above-mentioned disadvantages are reduced to a large extent. Its construction has become possible partly by virtue of the highly increased sensitivity of the radio-frequency identification electronics developed by applicant. Thus, for instance, an earmark of a diameter of only 20 mm can be read radiographically at a distance of more than 50 cm notwithstanding the low field strengths allowed in Europe.

The use of the above-mentioned "ear"mark is naturally not limited to animals alone; the electronic identification device can also be employed in the identification of articles to which the identification device, which may, for instance, have the form of a label or another suitable form, can be attached as a kind of press-stud in the same manner as to animal ear. In that case, too, an identification device according to the invention provides the advantage over differently designed identification devices, such as for instance flat or cylindrical (ear)marks, that there is little chance of the identification device being caught on objects in the environment and being torn loose.

Applications include, for instance, boxes and crates to be identified electronically and also clothes which are to be cleaned in a laundry but should remain individually recognizable. The construction of the present identification device renders it highly resistant to its environment, both in the animal quarters and in the slaughterhouse, and also to mechanical and chemical conditions, such as in a washing process and in the other uses indicated.

Some exemplary embodiments of the identification device according to the invention will now be further described with reference to the accompanying drawings.

Figure 2:
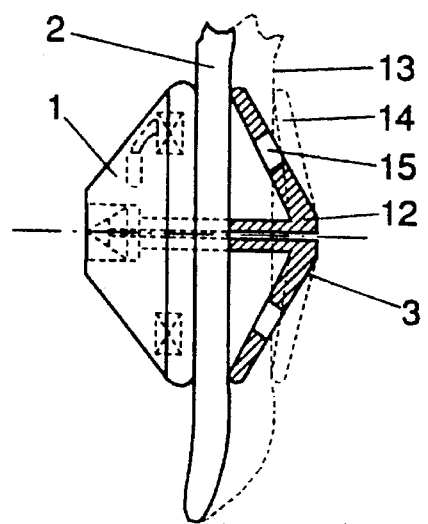
Figure 3:
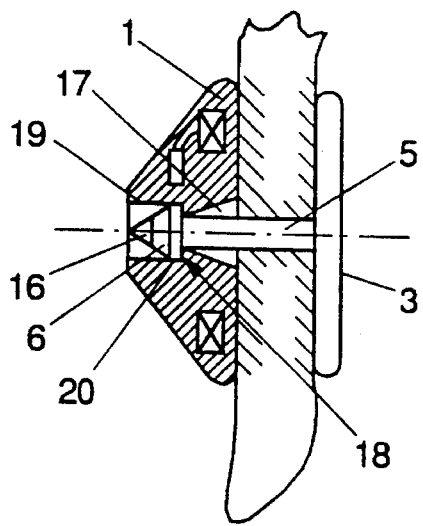
Figure 4:
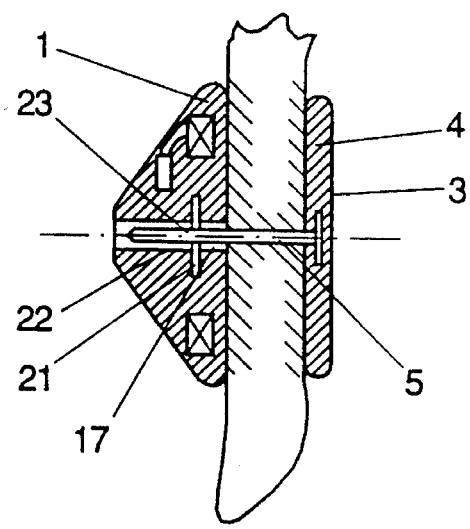
Figure 5:
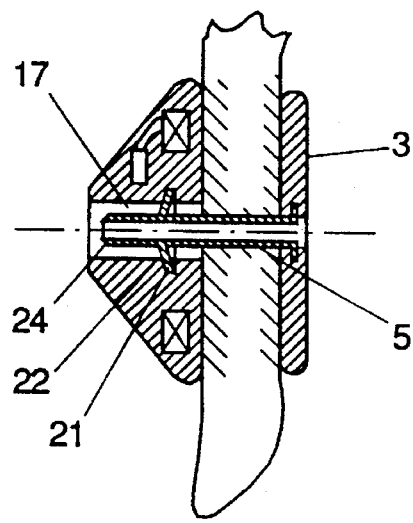
Figure 6:
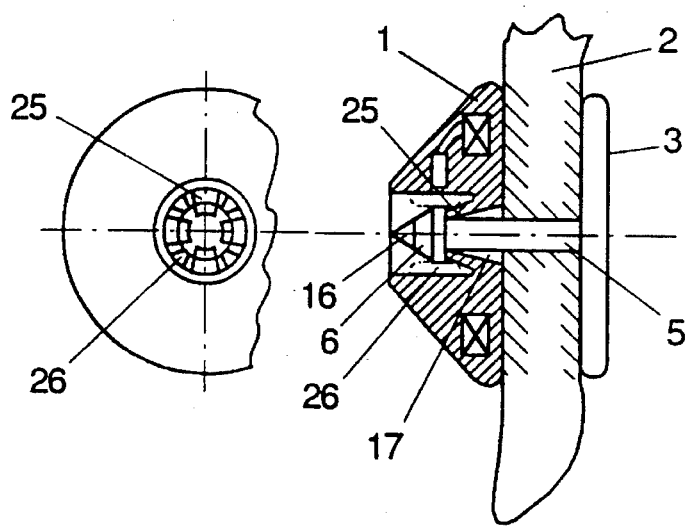
Figure 7:
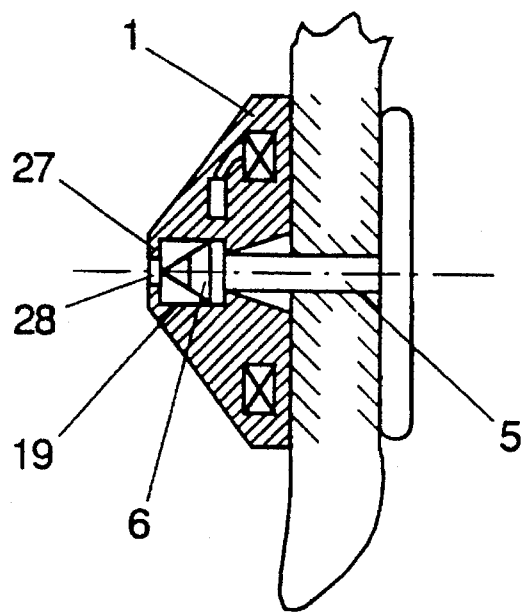
Figure 8:
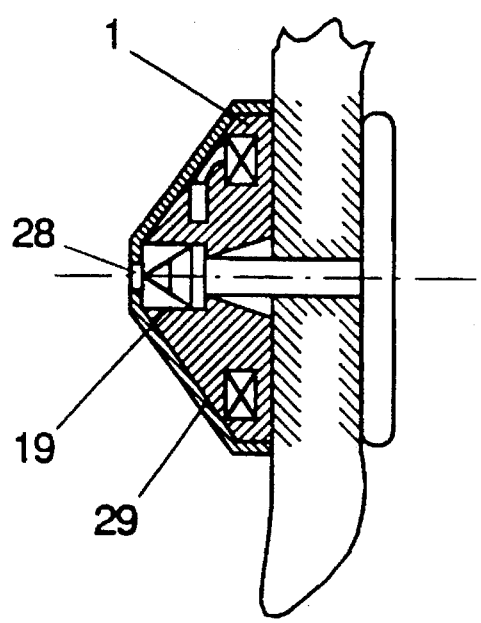
Figure 9:
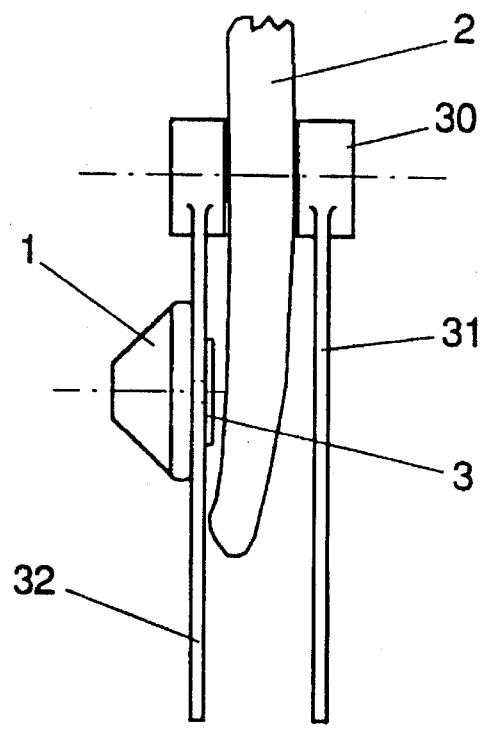
Figure 10:
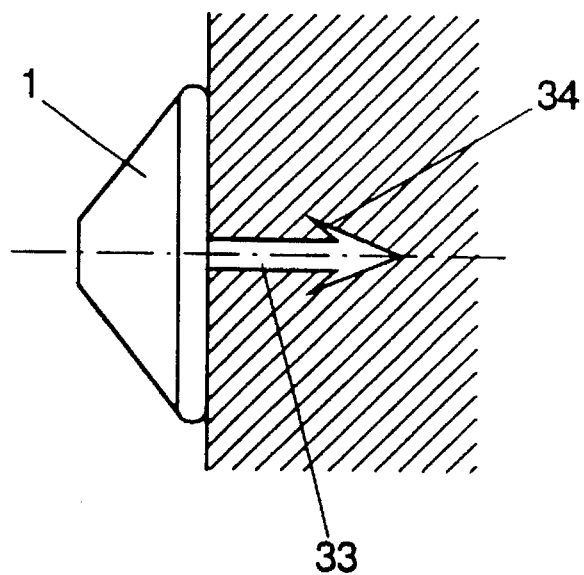

FIG. 1 schematically shows a first embodiment of an identification device according to the invention used as an earmark;

FIG. 2 schematically shows a variant of the earmark of FIG. 1;

FIG. 3 schematically illustrates a possible way of attaching an earmark according to the invention;

FIGS. 4 and 5 schematically show examples of variants of FIG. 3;

FIG. 6 schematically shows yet another variant of FIG. 3;

FIG. 7 schematically shows an example of an identification device according to the invention designed for single use;

FIG. 8 schematically shows a variant of FIG. 7;

FIG. 9 illustrates an example of a particular use of an identification device according to the invention; and FIG. 10 schematically shows yet another example of an embodiment of an identification device according to the invention.

FIG. 1 indicates that an identification device designed as an earmark is attached to an ear of an animal or an article 2 by means of a countermember 3 serving for attachment, comprising a flat flange 4, a pin 5 and a conical arrowhead-shaped head 6. The head 6 is at least partly elastically deformable and can be forced through a bore as far as into the wider chamber 19. Provided in the mark 1 are a receiving coil 7 and an integrated circuit 8 (which may or may not be accommodated in a housing (not shown)). Coil 7 has its ends connected to IC 8 and therewith forms a radio-frequency electronic component, commonly designated transponder or responder. By means of a transceiver installation (not shown), the electronic circuit can be read out at some distance, the (unique) number, stored in the memory of the electronic circuit, being transmitted in known manner. An example of an electronic circuit suitable for this purpose is described in applicant's U.S. Pat. No. 4,196,418.

Characteristic of the invention is that the shape of mark 1 is such that, in the case of a mark for animals, the mark cannot be gripped by other animals between their teeth and be torn off, or, in the case of a mark for articles, the mark is not caught on objects in the environment and thereby torn loose. The external shape 9 of the member 1 comprising the identification circuit has therefore been selected such that teeth and obstacles will slip off. To that end, the shape of the identification device or (ear)mark 1 in the example shown is substantially conical and the surface is preferably smooth and hard. Nor should it be possible for the teeth or obstacles to get a grip onto the back of mark 1. Therefore this surface should lie flat against the ear or the article, as shown at base 10. In the case as shown, this has been realized by choosing the length of pin 5 in correspondence with the thickness of the ear of the animal or the article 2. The flange 4 of the attachment member or countermember, too, will then be disposed in flat abutment, so that the teeth/obstacles cannot get any grip on the flange 4 either. In addition to teeth of an aggressive animal, it might also happen that parts of the environment of the animal, for instance fencing, hook onto the mark and tear it out. For that reason, too, the flat abutment of the two mark members 1 and 4 is important. If so desired, the unique number provided in member 1 can be fitted on the visible side 11 of flange 4 so as to be wholly or partly visible. Advantageously this can be done in unerasable manner, for instance by means of a laser beam. An advantage of such a visible (and unerasable) number is the possibility of visual recognition of the animal or article. Moreover, an unerasable number promotes fraud prevention, particularly when a countermember provided with this number is supplied only once along with the unique life number. Imitation is not easily possible. In the case of reuse of the mark, if any, for instance after slaughter, an identical countermember with the original number can be supplied under due control. If so desired, a label with a reprogrammable code number can be supplied. To prevent fraud, it should be impossible for such reprogramming to be effected other than centrally and with a particular code key. A new countermember with readable, unerasable number can then be made at the same time.

Member 1 of the mark according to the invention can be made of different parts or be injection molded in one piece from a suitable synthetic plastic. The synthetic plastic should preferably have a hard and smooth surface so as to enhance the mark's sliding along other objects. Also, the synthetic plastic should be resistant to any chemical (liquid) substances which are utilized in the environment where the identification device is employed.

FIG. 2 shows an example of a mark 1 according to the invention, but now with a "correspondingly growing" countermember 3. The fact is that if the present mark is used as a life number, it must be fitted to the animal as soon as possible after birth. The ear 2 of the animal is still thin then. If the flange 4 of countermember 3 were in flat abutment as in FIG. 1, then the growth in thickness of the ear 2 would be hampered; even infections might occur. To prevent this, the countermember 3 is provided with a resilient (for instance synthetic rubber) flange 12. Now, if the thickness of the ear 2 increases during growth to a thickness as indicated at 13, for instance, then flange 12 deforms into position 14, however, without exerting a pressure on the ear so large as to give rise to growth disturbances or infection. To prevent the ear tissue from dying off under flange 12, it can be provided, in accordance with the invention, with one or more holes 15 allowing access of air, so that necrosis is prevented. The flange 12 is preferably arranged on the proximal side of the ear.

FIG. 3 schematically shows a possible way of attaching an (ear)mark 1 according to the invention. The countermember 3 consists, in the usual manner, of a resilient, optionally slightly elastic, synthetic plastic, for instance polyurethane. The head 6 of the pin 5 is provided with a metal tip 16 for piercing the tissue as it is being fitted into the article or, for instance, in the ear of an animal. According to the invention, the hard, non-resilient, mark 1 comprises a conically narrowing bore 17 whose smallest diameter is smaller than the largest diameter of head 6. Via a flat shoulder 18 the bore 17 abruptly merges into a wider cylindrical opening 19 which has approximately the same diameter as the largest diameter of head 6. When being fitted, the countermember 3, after being passed through the tissue, is pushed further through the conical bore 17 by its head 6. In the process, the edge 20 of the head 6 is compressed and subsequently regains its original shape in the cylindrical opening 19. Thus, the attachment of mark 1 is a fact. Retraction of head 6 through the bore 17 is so difficult that shank 5 of countermember 3 will break first. The particular aspect of this attachment is that only the resilience of head 6 needs to be used to obtain a sufficiently strong anchoring. In known constructions, member 1 is also resilient and stretches during the passage of the head 6. With a mark according to the invention, however, this is impossible inasmuch as the contents of member 1, i.e. the electronic circuit, should not deform and also because of the very minor dimensions of member 1 (for instance φ20 mm). According to the invention, the identification device proper, i.e., member 1, is made of hard material that is difficult to deform.

FIG. 4 schematically illustrates another example of a different method of attaching the mark 1, viz., with a countermember 3 comprising a substantially cylindrical metal pin 5 and a suitable synthetic plastic flange 4. Naturally, this flange may again have a resilient form as shown in FIG. 2. After having been pushed through the tissue, the pin 5 is retained in mark 1 by a plate 21 arranged in the bore 17, this plate 21 being provided with springing lips 22 in known manner. This plate is made of a material which is harder than that of pin 5, so that the lips 22 through the sharp edges 23 thereof press into the material of pin 5 and thereby make it impossible for pin 5 to be pulled out. The plate 21 may for instance be made of spring steel.

FIG. 5 shows a method of attachment which is similar to that of FIG. 4, but now shank 5 is tubular. As a consequence, the countermember 3 can be light and yet have a relatively large diameter of shank 5, so that the mark will less easily be torn from the article or animal if any transverse forces are exerted thereon. As the tubular part 5, which may optionally be sharpened at the end, as shown at 24, is forced through, for instance, the ear of an animal, a small portion of the ear is punched out. As a result, the remaining forces of the ear tissue on the relatively thick pin are small, so that irritation and necrosis of the tissue are prevented. Moreover, such a punched-out hole has straight and clean sides, so that infection will arise less easily. In the embodiments shown in FIGS. 4 and 5, the bore 17 is not conical.

FIG. 6 shows an exemplary attachment of the mark whereby, within the member 1 of the mark 1, which is otherwise difficult to deform, if at all, two or more resilient lips 25 are provided in the bore 17, these lips forming one whole with mark 1. The countermember 3 can be made of resilient synthetic plastic with a metal tip 16 (as in FIG. 3), but now member 3 may also consist entirely of hard synthetic plastic. As tip 6 of countermember 3 is introduced into the mark 1, the lips 25 spring outwardly and allow tip 6 to pass. They subsequently spring back around shank 5, so that the countermember cannot be retracted anymore. If so desired, dam-shaped projections 26 can be provided between the lips, these projections 26 forming one whole with mark 1. They serve for centering the head 6 after the countermember 3 has been fitted, so that it cannot be torn loose through lateral movement.

FIG. 7 shows an example of a mark 1 according to the invention for single use. The chamber 19 of the mark, in which the head of the pin 5 is received when the mark is attached to an article or, for instance, an ear of an animal, is now closed off (sealed) at the front through wall 27. To prevent necrosis, an air hole 28 can be provided in the wall 27. The chamber 19 can then communicate with the ear tissue, for instance via grooves in the head 6 and/or the wall of the chamber, the shoulder 18 and/or the bore 17. Now, if the pin 5 is cut in order to remove the mark 1, head 6 cannot be removed from mark 1 without visible damage to wall 27, which would be discovered immediately upon a check after (fraudulent) replacement in another animal or article. In the design according to the preceding drawings, the head 6 of pin 5 can be removed without leaving any traces, so that reuse (sometimes desired) becomes possible.

In the example of FIG. 8, the seal of the chamber 19 in mark 1 is obtained by arranging an additional cap 29 over mark 1, this cap 29 sealing the chamber 19 again. Here, too, an opening 28 can be provided again. In known manner (for instance, through ultrasonic welding) the cap can be secured onto mark 1 and, as a result, cannot be removed or can be removed only with special tools. This cap 29 can also be arranged as a protection against ambient influences and may then be replaceable. Such an exterior influence may for instance be the momentarily high temperature arising during depilation of a pig after slaughter in a reverberating furnace. For the purpose of reuse of the mark 1, after it has been removed, cap 29 can be detached and after washing and sterilization a new cap 29 can be fitted when the old one has been affected too much. The cap 29 should preferably form a hard and smooth surface again.

FIG. 9 illustrates a particular application of the above-described mark, viz., as an addition to an (ear)mark 30 which may possibly exist already or even be attached to an animal already, which may for instance be made of synthetic plastic. In the Netherlands for instance, it is obligatory to provide each calf with a plastic bag provided with a visual unique code and which can be read through a barcode.

It is conceivable that in the future this code will be adapted so as to be automatically readable at some distance as well, for instance for the purpose of farm management. This can be realized with an identification device according to the invention. Naturally, this identification device can be normally fitted as an additional (ear)mark to calves which have already been marked. This, however, constitutes an additional burden on the animal. By providing a mark according to the invention in one of the flaps 31, 32 of the synthetic plastic label 30 which is already present, the procedure is less of a burden on the animals and the risk of infection inevitably associated with an earmark is avoided. The mark 1 is attached through the synthetic plastic flap 32 in the manner described above, using countermember 3. Mark 1 and countermember 3 can be constructed as described with reference to FIGS. 1–8.

FIG. 10 shows an example of the mark 1 according to the invention, but now provided with its own fixedly connected attachment member, for instance a metal pointed pin 33 with barbs 34. Such a mark can be pushed into an article suitable therefor but also into the carcass of a slaughtered animal and remains in position by virtue of the barbs 34. In this case, too, the conical shape (or pyramid shape) of mark 1 prevents loss as a result of the mark being caught on an object in the environment.

It is observed that, after the foregoing, various modifications will readily occur to a person of ordinary skill in the art. Thus, for instance, the surface of the member drawn as a cone may be pyramid-shaped and/or be slightly concavely or convexly curved in side view. Also, grooves might optionally be provided, extending from the top to the bottom of the conical shape. It is important, however, that the identification device offers little hold or grip and that the head 6 of the pin 5 of the countermember can be fitted into and locked in member 1 without deformation of member 1. As a consequence, the member 1 may be small and be made of hard material that is difficult to deform. Nor is any risk involved the of the electronic circuit being damaged during the attachment to an article or animal. This provides a high degree of reliability of the identification device as well as a high degree of resistance to damage, loss and fraud. The resistance to damage, loss and fraud is further increased by the use of a properly abutting shape of the member 1 and the countermember 3 as well as through the conical shape of member 1.

We claim:

1. A device for identifying animals or articles, said device comprising:

an identification member including an identification device located internally of said identification member with an electronic identification circuit storing a code and enabling automatic remote detection of the code of the identification device, said identification member being made of hard, non-resilient material and an external shape of said identification member being frustoconical, starting from a base which in operation abuts against the article or the animal, narrows substantially taperingly and smoothly to an end which in operation is located remote from the article or animal, so that said identification member cannot be gripped by another animal between its teeth or be caught on obstacles or other objects, an attachment member for attaching said identification member to the article or animal, said attachment member being resilient and deformable upon contact with said identification member, a bore of said identification member extending between said base and said end and transversely to the base, and retaining means located in said bore for receiving a pin-shaped element of said attachment member.

2. A device according to claim 1, wherein said retaining means includes a widened chamber located remote from the base and a shoulder forming a transition between said bore and said widened chamber, said attachment member having a pin-shaped element comprising an at least partly elastically deformable head which has a greater diameter than said bore.

3. A device according to claim 2, wherein said at least partly elastically deformable head comprises a hard tip which is difficult to deform.

4. A device according to claim 2, wherein said bore tapers from said base, at least between said base and said shoulder.

5. A device according to claim 2, wherein the widened chamber, at the end remote from the base, is provided with a sealing means.

6. A device according to claim 5, wherein the sealing means is formed by a cap of hard and smooth material, fitted around the member comprising the identification member.

7. A device according to claim 6, wherein the cap is made of heat-resistant material.

8. A device according to claim 5, wherein the sealing means is provided with an air opening communicating with the widened chamber.

9. A device according to claim 1, wherein the bore terminates at a distance from the base into a widened chamber which receives a head of a pin-shaped element, and wherein the wall of the bore, at the location of the transition to the widened chamber, is provided with springing lips which engage behind the head of the pin shaped element.

10. A device according to claim 9, wherein the bore tapers from the base.

11. A device according to claim 9, wherein the head of the pin-shaped element is provided with a hard tip which is difficult to deform.

12. A device according to claim 9, wherein between the springing lips, centering means for the head of the pin-shaped element are located.

13. A device according to claim 1, wherein the retaining means comprise a metal plate with a central bore which is bounded by bent springing lips, and wherein the attachment member has a pin-shaped element comprising a cylindrical pin which is inserted through the bore and is then retained by the springing lips.

14. A device according to claim 13, wherein the cylindrical pin is tubular.

15. A device according to claim 1, wherein the attachment member has a pin-shaped element which is provided with a flange of hollow and conical or pyramid-shaped design, which in operation is located against a surface of the article or the animal, remote from the member comprising the identification circuit.

16. A device according to claim 15, wherein the flange is provided with a number of air holes.

17. A device according to claim 1, wherein said identification member is made of heat-resistant material.

18. A device according to claim 1, wherein the identification device is connected to a flap of a earmark for livestock.

19. An electronic identification device for animals or articles, suitable for use as an earmark, said electronic identification device comprising:

at least a first member having a frustoconical shape between a top and a base with an electronic identification circuit provided in the member of frustoconical shape, attachment means for the member of frustoconical shape, said member of frustoconical shape being of hard, substantially non-resilient synthetic plastics material which encloses the identification circuit, said attachment means being arranged to engage the member of frustoconical shape at a side of said base so that said base, in use, lies flat against the animal or article, a central bore of said member extending between said base and said top and extending transversely to the base, and retaining means located in said bore for receiving a pin-shaped element of the attachment means.

20. An electronic identification device according to claim 19, wherein the retaining means comprises a widened chamber located remote from the base and a shoulder forming a transition between the bore and the widened chamber and, the attachment means having a pin-shaped element including an at least partly elastically deformable head which has a greater diameter than the bore.

21. An electronic identification device according to claim 20, wherein the bore tapers from the base, at least between the base and the shoulder.

22. An electronic identification device according to claim 20, wherein the head of the pin-shaped element is provided with a hard tip which is difficult to deform.

23. An electronic identification device according to claim 19, wherein the bore terminates at a distance from the base in a widened chamber capable of receiving a head of a pin-shaped element of the attachment means, and a wall of the bore, at the location of the transition to the widened chamber, is provided with springing lips capable of engaging behind the head of the pin-shaped element.

24. An electronic identification device according to claim 23, wherein between the springing lips, centering means for the head of the pin-shaped element are located.

25. An electronic identification device according to claim 19, wherein the retaining means includes a metal plate arranged in the bore, said plate having a central opening which is bounded by bent springing lips, and the attachments means has a pin-shaped element which comprises a cylindrical pin which can be inserted through the opening and then retained by the springing lips of the metal plate.

26. An electronic identification device according to claim 25, wherein the cylindrical pin is tubular.

27. An electronic identification device according to claim 19, wherein the attachment means has a pin-shaped element which is provided with a flange of hollow and conical or pyramid-shaped design, which in operation is located against a surface of the article or the animal, remote from the member enclosing the identification circuit.

28. An electronic identification device according to claim 27, wherein the flange is provided with a number of air holes.

29. An electronic identification device according to claim 19, wherein the widened chamber, at an end remote from the base, is provided with a sealing means.

30. An electronic identification device according to claim 29, wherein the sealing means is formed by a cap of hard and smooth material, fitted around the member enclosing the identification circuit.

31. An electronic identification device according to claim 29, wherein the sealing means is provided with an air opening communicating with the widened chamber.

32. An electronic identification device according to claim 19, wherein the identification device is connected to a flap of an earlabel for livestock.

* * * * *